H. POTH.
Wheel for Vehicles.
No. 81,943.
Patented Sept. 8, 1868.
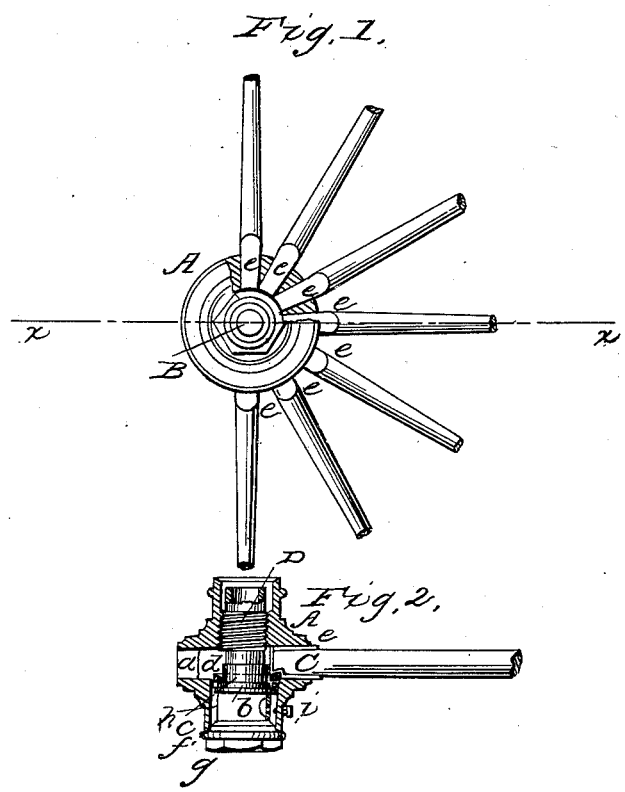
Witnesses:
Inventor:

UNITED STATES PATENT OFFICE.

HENRY POTH, OF PITTSBURG, PENNSYLVANIA.

IMPROVEMENT IN WHEELS FOR VEHICLES.

Specification forming part of Letters Patent No. 81,943, dated September 8, 1868.

*To all whom it may concern:*

Be it known that I, HENRY POTH, of Pittsburg, in the county of Allegheny and State of Pennsylvania, have invented a new and useful Improvement in Wheels for Vehicles; and I do hereby declare that the following is a full, clear, and exact description thereof, which will enable others skilled in the art to make and use the same, reference being had to the accompanying drawings, forming part of this specification, in which—

Figure 1 is an end view of the hub, with a portion of the same broken away to show the beveled ring and its relation to the notched tenon-plates. Fig. 2 is a central section of the hub through the line $x\ x$, Fig. 1.

Similar letters of reference indicate like parts.

My invention comprises certain improvements in wagon-wheels, which relate to the securing of the spokes and the lubrication of the box, both of which are herein duly set forth.

In the drawings, A is a metal hub, having tapering mortises $a$ for the spoke-tenons C.

B is the axle-box, formed with a screw-thread, D, which fits a hollow threaded screw in the hub, as shown.

The box is provided with a collar, $b$, against which rests a packing-ring, $c$, of any suitable elastic material.

Against the packing-ring rests a metal ring, $d$, which is beveled, as shown, to serve as a key for the spokes, for the tenons C of the spokes are provided with metal plates $e$, which cover the ends and lateral faces of the tenons, thus protecting them from wear, but mainly is for affording a plate which, being indented at one angle to form a notch in which beveled ring $d$ fits, serves as a key to hold in the spokes. At the end of the hub is another packing-ring, $f$, which is clamped between the said end and the flange $g$ of the box.

When the box is turned in, the ring $d$ is pressed tightly in the notches of the plates $c$ all around the hub, and the notches being formed as shown in Fig. 2, the ring serves as a key to hold them from withdrawal.

When the box is turned in, the packing-rings $c$ and $f$, being compressed, form a tight joint, thus leaving a space, $h$, inclosed between them, (the box and the inner surface of the hub,) which spaces I employ as an oil-recess.

A small hole is made through the box to admit the oil to the axle, and this hole is closed completely, or its aperture contracted to the proper degree, by a set-screw, $i$, passing through the hub. The hole in the box being in line with the hole in the hub, the point of the screw $i$ may be set in to completely close the inner hole or to regulate the quantity of oil escaping through. The screw is withdrawn entirely when the oil space or cup $h$ is filled through the hole with oil.

Having thus described my invention, I claim as new and desire to secure by Letters Patent—

1. The combination, in a vehicle-wheel, of the tenon-plates $e$, beveled ring $d$, screw-box B D, and metal hub A, substantially as herein shown and described.

2. The combination, in a vehicle-wheel, of the screw-box B D, packing-rings $c$ and $f$, when arranged to form an oil-tight space, $h$, between the box B and the metal hub A, and provided with holes for the screw $i$, all substantially as herein shown and described.

The above specification of my invention signed by me this 18th day of July, 1868.

HENRY POTH.

Witnesses:
PHILIP R. KINCAID,
ARTHUR DELKS.